US012583602B2

(12) United States Patent
Long et al.

(10) Patent No.: US 12,583,602 B2
(45) Date of Patent: Mar. 24, 2026

(54) AIRCRAFT OVERRIDE FOR AN ENERGY STORAGE SYSTEM

(71) Applicant: Rolls-Royce Corporation, Indianapolis, IN (US)

(72) Inventors: Stephen Andrew Long, Indianapolis, IN (US); Michael Dougherty, Indianapolis, IN (US); Tomasz Marek Lubecki, Singapore (SG); Firman Sasongko, Singapore (SG); Chandana Gajanayake, Singapore (SG); Michael Adam Zagrodnik, Singapore (SG)

(73) Assignee: Rolls-Royce Corporation, Indianapolis, IN (US)

( * ) Notice: Subject to any disclaimer, the term of this patent is extended or adjusted under 35 U.S.C. 154(b) by 259 days.

(21) Appl. No.: 18/462,210

(22) Filed: Sep. 6, 2023

(65) Prior Publication Data

US 2025/0074613 A1    Mar. 6, 2025

(51) Int. Cl.
B64D 31/00       (2024.01)
B60L 58/10       (2019.01)
(Continued)

(52) U.S. Cl.
CPC .............. B64D 31/00 (2013.01); B60L 58/10 (2019.02); B64D 27/24 (2013.01);
(Continued)

(58) Field of Classification Search
CPC ...... B64D 31/00; B64D 27/24; B64D 27/026; B64D 2221/00; B60L 58/10;
(Continued)

(56) References Cited

U.S. PATENT DOCUMENTS

| | | | |
|---|---|---|---|
| 8,335,067 | B2 | 12/2012 | Divan |
| 9,837,834 | B2 | 12/2017 | Sugiyama et al. |

(Continued)

FOREIGN PATENT DOCUMENTS

| | | |
|---|---|---|
| CH | 452666 A | 3/1968 |
| CN | 203056572 A | 7/2013 |

(Continued)

OTHER PUBLICATIONS

Extended Search Report from counterpart European Application No. 24191903.4 dated Jan. 24, 2025, 11 pp.
(Continued)

*Primary Examiner* — Donald J Wallace
*Assistant Examiner* — Jalal C Coduroglu
(74) *Attorney, Agent, or Firm* — Shumaker & Sieffert, P.A.

(57)    ABSTRACT

A power reduction system for an energy storage system of an aircraft includes a controller configured to control power reduction of power supplied from the energy storage system to an aircraft engine supply bus; and an override switch configurable in an override state and a non-override state. The override switch is configured to: in the non-override state, permit the controller to control the power reduction according to a default configuration comprising one or more parameters that trigger the power reduction; and in the override state, control the power reduction to be performed according to a relaxed configuration that at least one of relaxes and omits the one or more parameters in the default configuration.

15 Claims, 8 Drawing Sheets

(51) Int. Cl.
    *B64D 27/02*         (2006.01)
    *B64D 27/24*         (2024.01)

(52) U.S. Cl.
    CPC ......... *B60L 2200/10* (2013.01); *B64D 27/026* (2024.01); *B64D 2221/00* (2013.01)

(58) Field of Classification Search
    CPC ..... B60L 2200/10; H02J 3/322; H02J 7/0063; H02J 2310/44
    See application file for complete search history.

(56) References Cited

U.S. PATENT DOCUMENTS

| | | | |
|---|---|---|---|
| 9,960,637 B2 | 5/2018 | Sanders et al. | |
| 10,283,968 B2 | 5/2019 | ElBsat et al. | |
| 10,601,187 B2* | 3/2020 | Hewitt | H01R 13/6666 |
| 10,818,983 B2 | 10/2020 | Yonemoto et al. | |
| 11,209,475 B2 | 12/2021 | Barnet | |
| 11,437,665 B2* | 9/2022 | Soto | H01M 10/613 |
| 11,560,237 B2 | 1/2023 | Zoppitelli et al. | |
| 2012/0101671 A1* | 4/2012 | Caouette | B63H 21/21 180/65.265 |
| 2015/0123468 A1* | 5/2015 | Wu | H02H 1/00 307/326 |
| 2018/0331534 A1 | 11/2018 | Nojima | |
| 2018/0375323 A1 | 12/2018 | Eberts et al. | |
| 2019/0061974 A1 | 2/2019 | Eberts et al. | |
| 2020/0162128 A1* | 5/2020 | Greene | H04B 5/266 |
| 2021/0408618 A1* | 12/2021 | Soto | H01M 10/486 |
| 2022/0017064 A1* | 1/2022 | Dougherty | H02J 7/1423 |
| 2022/0169398 A1* | 6/2022 | Ouellet | H02J 7/1446 |
| 2022/0258876 A1* | 8/2022 | Dasgupta | F01D 15/10 |
| 2022/0340151 A1* | 10/2022 | Farag | B60W 50/0205 |
| 2022/0363402 A1 | 11/2022 | Schenk et al. | |
| 2024/0069527 A1* | 2/2024 | Long | B64D 13/006 |
| 2025/0074613 A1* | 3/2025 | Long | H02J 7/0063 |

FOREIGN PATENT DOCUMENTS

| | | | |
|---|---|---|---|
| EP | 2523296 A1 | 11/2012 | |
| EP | 2549613 A1 | 1/2013 | |
| EP | 3203251 A2 | 8/2017 | |
| EP | 3512061 A1 | 7/2019 | |
| EP | 3 670 339 A1 | 6/2020 | |
| EP | 3915880 A1 | 12/2021 | |
| EP | 3089303 B1 | 7/2022 | |
| WO | WO 2018/191769 A1 | 10/2018 | |

OTHER PUBLICATIONS

Renesas Electronics Corporation, "RS-485 Transient Protection in Industrial DC-Supply Buses", Nov. 2017, 7 pp.
U.S. Appl. No. 18/358,540, filed Jul. 25, 2023, naming inventors Huber et al.
Response to Extended Search Report dated Jan. 24, 2025, from counterpart European Application No. 24191903.4 filed Aug. 13, 2025, 73 pp.

\* cited by examiner

300

700

702 — Energy storage system is configured in a non-override mode corresponding to an override switch in a non-override state 704 — Controller detects that the override switch switched from the non-override state 706 — Energy storage system switches to being configured in the override mode corresponding to the override switch in the override state

800

802

Energy storage system is configured in a non-override mode corresponding to an override switch in a non-override state

804

Switch to override mode?

No

Yes

806

Energy storage system switches to being configured in the override mode corresponding to the override switch in the override state

AIRCRAFT OVERRIDE FOR AN ENERGY STORAGE SYSTEM

TECHNICAL FIELD

This disclosure relates to electrical energy storage systems in hybrid aircraft and, in particular, to an override switch to control power reduction.

BACKGROUND

Hybrid aircraft systems utilize batteries to store and deliver electric power. Typically, batteries supply their stored power as direct current (DC) voltage. The DC voltage may be converted to alternating current (AC) voltage, or may be used directly as a source of electric power for DC or AC loads. The electric power stored in batteries is depleted over a period of time according to the current flow out of the batteries. As the batteries are depleted, the voltage output of the batteries drops. Batteries may be recharged using power generated by another power source such as a battery charger being supplied AC power.

BRIEF DESCRIPTION OF THE DRAWINGS

The embodiments may be better understood with reference to the following drawings and description. The components in the figures are not necessarily to scale. Moreover, in the figures, like-referenced numerals designate corresponding parts throughout the different views.

DETAILED DESCRIPTION

A power reduction system for an energy storage system for an aircraft includes a controller configured to control power reduction of power supplied from the energy storage system to an aircraft engine supply bus, and an override switch configurable in an override state and a non-override state. In the non-override state, the override switch is configured to permit the controller to control the power reduction according to a default configuration, which includes or defines one or more parameters that trigger the power reduction. In the override state, the override switch is configured to control the power reduction to be performed according to a relaxed configuration that relaxes and/or omits the one or more parameters in the default configuration.

One interesting feature of the systems and methods described below may be that the energy storage system may supply power, without activating power limiting circuitry, to the aircraft engine supply bus for a longer period of time under the relaxed configuration than under the default configuration. Another interesting feature is that the override switch may provide a pilot or other personnel of the aircraft with the ability to decide whether the energy storage system should reduce power and/or whether to relax conservative parameters set in the default configuration. An additional interesting feature is that the override switch may desirably risk damage to the energy storage system in order to prevent and/or reduce airframe damage and pilot risk exposure. Further interesting features are that the below described override switch may allow the energy storage system to deliver power in a Single Engine Plus (or emergency) mode for a longer period of time than in current aircraft systems, and/or may prevent the loss of propulsive power in Single Engine Plus mode due to a protection mechanism being triggered (e.g., a sensor malfunctioning or becoming a failed open circuit). Another interesting feature is that the override switch may provide the pilot with the ability to reduce the probability of false positive trips, including when planning for or dealing with critical flight conditions. The override switch may offer the ability of the pilot to relax or remove protection mechanisms of the energy storage system should the pilot deem it appropriate to do so, such as due to other exigent or critical circumstances.

Figure 1:
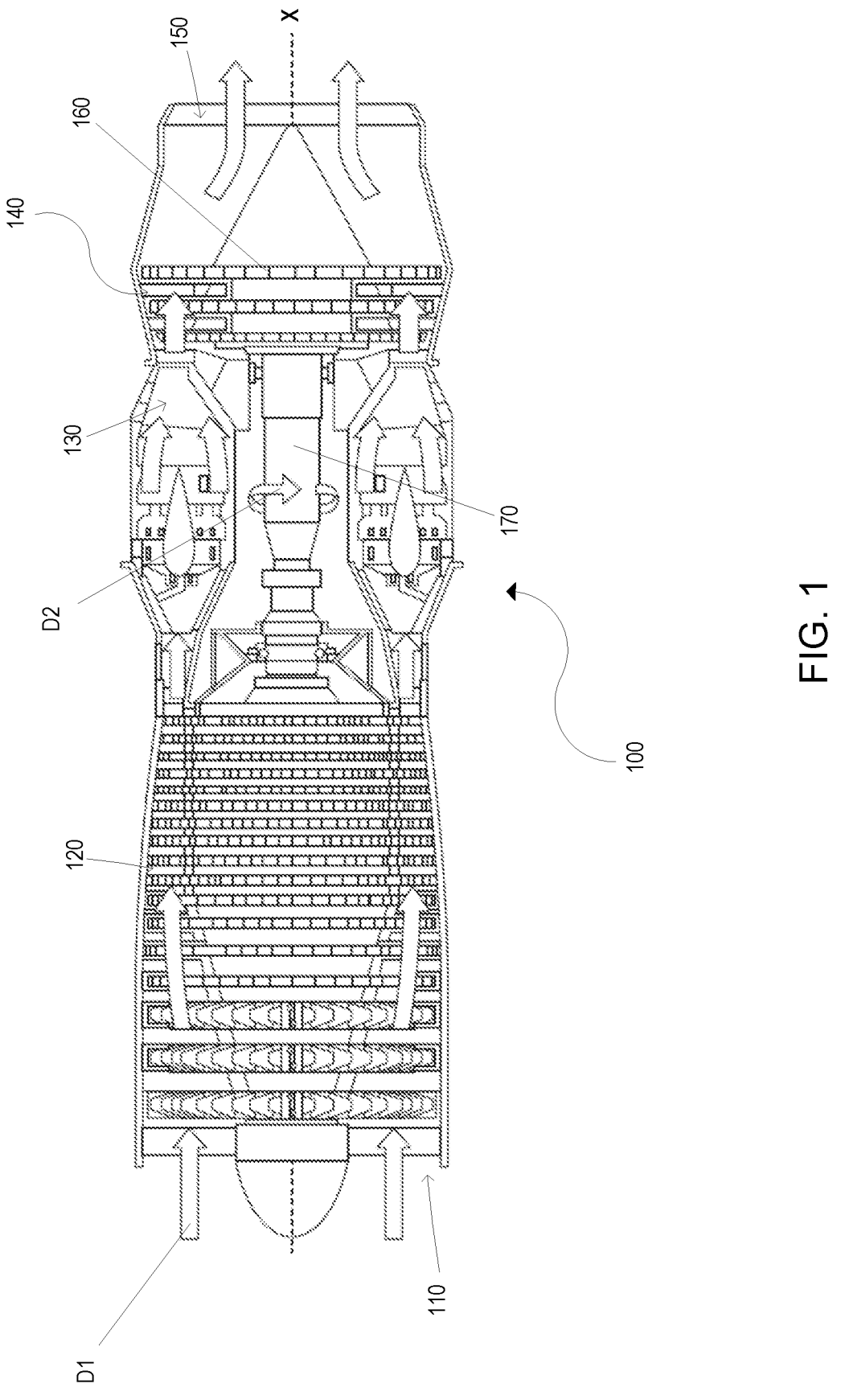
FIG. 1 is a cross-sectional view of an example gas turbine engine.

In connection with the override switch, FIG. 1 is a cross-sectional view of a gas turbine engine 100. In some examples, the gas turbine engine 100 may supply power to and/or provide propulsion of an aircraft. Examples of the aircraft may include a helicopter, an airplane, an unmanned air vehicle, a fixed wing vehicle, a variable wing vehicle, a rotary wing vehicle, an unmanned combat aerial vehicle, a tailless aircraft, a hover craft, and any other airborne vehicle. Alternatively or in addition, the gas turbine engine 100 may be utilized in a configuration unrelated to an aircraft such as, for example, an industrial application, an energy application, a power plant, a pumping set, a marine application (for example, for naval propulsion), a weapon system, a security system, a perimeter defense or security system.

The gas turbine engine 100 may take a variety of forms in various embodiments. Though depicted as a two-spool engine having a centrifugal compressor and axial flow gas generator and power turbine stages, in some forms the gas turbine engine 100 may have one or multiple spools and/or may be any form of axial flow engine or mixed centrifugal/axial flow engine. In some forms, the gas turbine engine 100 may be a turboprop, a turbofan, or a turboshaft engine. Furthermore, the gas turbine engine 100 may be an adaptive cycle and/or variable cycle engine. Other variations are also contemplated.

The gas turbine engine 100 may include an intake section 110, a compressor section 120, a combustion section 130, a turbine section 140, and an exhaust section 150. During operation of the gas turbine engine 100, fluid received from the intake section 110, such as air, travels along the direction D1 and may be compressed within the compressor section 120. The compressed fluid may then be mixed with fuel and the mixture may be burned in the combustion section 130. The combustion section 130 may include any suitable fuel injection and combustion mechanisms. The hot, high pressure fluid may then pass through the turbine section 140. As the hot, high pressure fluid passes through the turbine section 140, the fluid passes between adjacent blades 160, extracting energy from the fluid and causing the blades 160 to rotate around an axis of rotation corresponding to a centerline X of the turbine section 140. The rotation of the blades 160 turns a shaft 170 in a rotational direction D2, which in turn drives the compressor section 120. Discharge fluid may exit the exhaust section 150.

Figure 2:
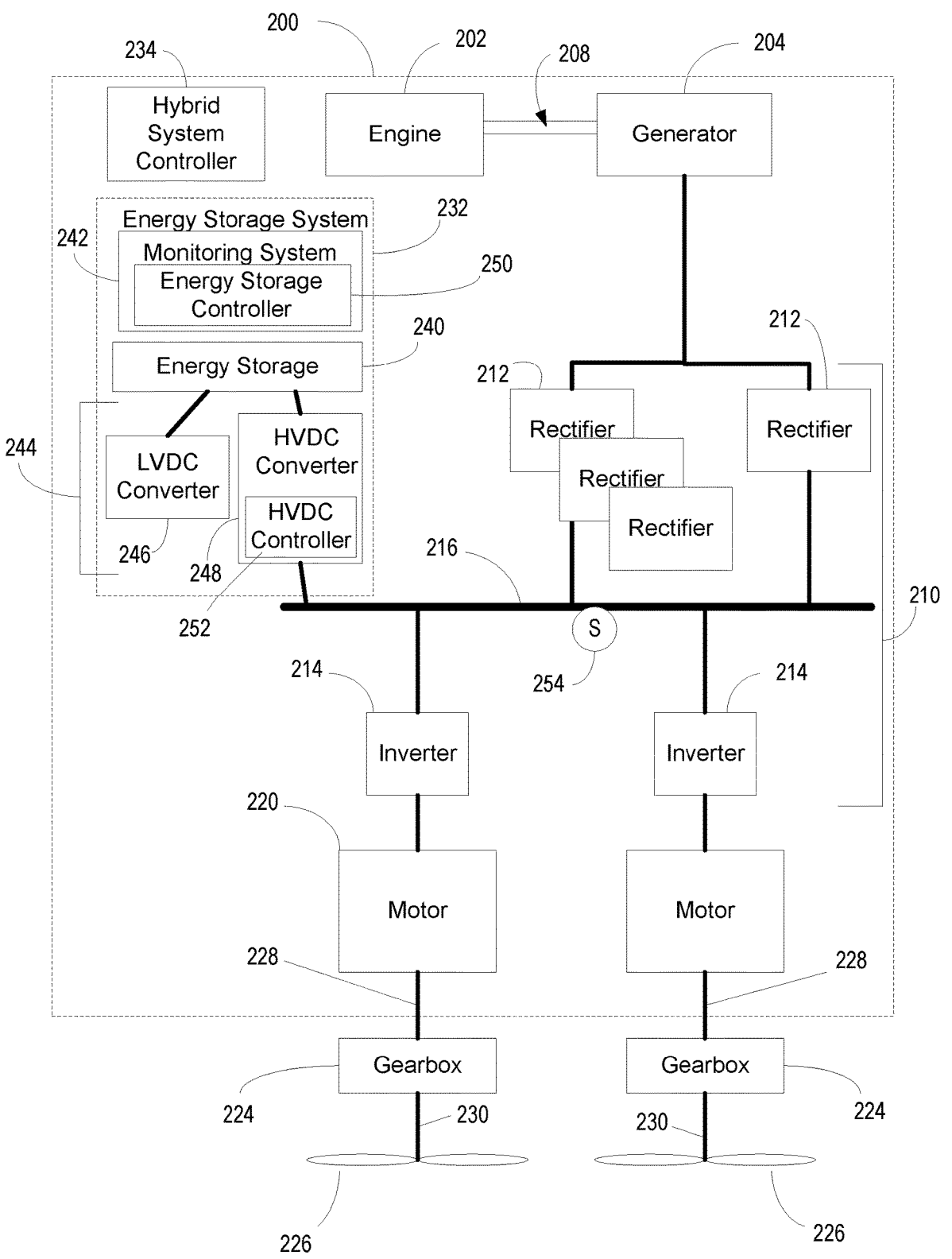
FIG. 2 is a block diagram example of an electric propulsion system for an aircraft.

FIG. 2 is a block diagram example of a power reduction system (examples of which are shown and described in further detail below with respect to FIGS. 3 and 4) in an electric propulsion system 200 for an aircraft. The electric propulsion system 200 of this example is a hybrid electric system that includes any number of electric generators 204 rotatably coupled with a respective one or more engines 202 to form one or more turbogenerators. In any of various examples, the one or more engines 202 may include gas turbine engine(s), diesel engine(s), piston engine(s), fuel cell(s), or other form of engine(s) and/or power system(s), or any of various combinations thereof, which may be used as a prime mover(s). In still other examples, the electric propulsion system 200 may be used in a fully electric application without the hybrid aspect, where energy is provided by an energy storage system 232 with no turbo-generator. In FIG. 2, the electric propulsion system 200 may be configured as a variable load supplied rotational energy by the engine 202. In the context of a hybrid electric system, the engine 202, such as when configured as a gas turbine engine, may be supplied fuel by a fuel system at a variable flow rate to vary the rotational torque output of the engine 202. The engine 202 may include a power takeoff that spins a rotational shaft 208 mechanically coupled to the electric generator 204.

The generator 204 may be an asynchronous or synchronous machine capable of outputting electric power when rotated by the shaft 208. The electric power may be output as alternating current (AC) or direct current (DC) power feeding one or more electric energy adapters 210. In the illustrated example, the generator 204 is an AC generator feeding one or more electric energy adapters 210. The electric energy adapter(s) 210 may include one or more rectifiers 212, one or more inverters 214, and/or other energy adapter devices or systems, such as converters, transformers, filters, and the like. The rectifiers 212 may be AC to DC rectifiers supplying rectified electric power output from the generator 204 to one or more aircraft engine supply busses 216. In this context, the power in the aircraft engine supply bus 216 is DC power. In other implementations, the power on the aircraft engine supply bus 216 is AC power. In such other implementations, the rectifiers 212 may be omitted such that the generator 204 is directly coupled to the aircraft engine supply bus 216, or the rectifiers 212 may be replaced and/or supplemented with other circuitry that modifies one or more of the characteristics of the AC power (frequency, amplitude, waveform, duty cycle, etc.) from the generator 204 before the AC power is provided to the aircraft engine supply bus 216. Additionally, in various implementations, loads may be electrically coupled with the aircraft engine supply bus 216 and supplied the electric power output from the generator 204. A voltage of the electric power on the aircraft engine supply bus 216 may be stepped up, stepped down, or converted, such as from DC to AC prior to being supplied to the loads. In the example of FIG. 2, the aircraft engine supply bus supplies inverters 214. For implementations where DC power is on the aircraft engine supply bus, the inverters 214 may convert the DC power to AC power and supply the AC power to one or more propulsor motors 220.

The propulsor motors 220 may be energized by the voltage present on the aircraft engine supply bus 216. In some embodiments such as shown in FIG. 2, the energized propulsor motors 220 may rotate respective gear boxes 224, which in turn may rotate respective propulsors 226, such as an airplane propeller or a helicopter rotor, which can provide lift and/or thrust to the aircraft. The propulsor motors 220 may each include one or more induction or synchronous motors operable to rotate a respective output shaft 228 when energized with a variable rotational torque. Each output shaft 228 may be mechanically coupled with a respective gear box 224. In addition, each gear box 224 may operate as a transmission system between a respective propulsor motor 220 and a respective propulsor 226 to change a rotational speed of a respective output shaft 228 of the respective propulsor motor 220 and supply rotational torque on a respective propulsor shaft 230 rotating the respective propulsor 226. FIG. 2 shows two sets of inverters 214, propulsor motors 220, gear boxes 224, propulsors 226, output shafts 228, and propulsor shafts 230. Other configurations may include only a single set of an inverter 214, a propulsor motor 220, a gear box 224, a propulsor 226, an output shaft 228, and a propulsor shaft 230, or more than two sets of inverters 214, propulsor motors 220, gear boxes 224, propulsors 226, output shafts 228, and propulsor shafts 230.

Also, in addition to the rectifiers 212 supplying power to the aircraft engine supply bus 216, an energy storage system (ESS) 232 may also supply either AC or DC power to the aircraft engine supply bus 216. In the example implementation in FIG. 2, the ESS 232 is configured to supply DC power. However, various other configurations enabling the ESS 232 to output AC power to the aircraft engine supply bus 216 may be possible. Also, in examples where the electric propulsion system 200 is a hybrid system for the aircraft or other vehicle, the system may also include a hybrid system controller (HSC) 234. In general, as used herein, a controller may include circuitry configured to perform at least some of the functions described herein. The circuitry may be in the form of only hardware, or a combination of hardware and software. For example, in some implementations, the circuitry may include digital logic circuitry or other hardware circuitry configured to perform at least some of the functions described herein without the use of software (of firmware). In other implementations, the circuitry may include a memory (volatile and/or non-volatile memory) storing computer instructions, and one or more processors (e.g., one or more central processing units (CPU)) configured to execute the computer instructions and/or logic based on the computer instructions, and upon execution of the computer instructions, is configured to perform at least some of the functions described herein. Still other implementations of a controller include a circuit, such as a processor, configured to execute software (e.g., computer instructions) to perform functions, but the controller itself does not include the software and/or the memory storing the software. Other implementations of the circuitry may include first hardware circuitry configured to perform some functions without use of software, and second hardware circuitry configured to perform other functions by executing software. Various configurations of a controller including circuitry in the form of hardware or a combination or hardware and software are possible. The present description also includes implementations including of a non-transitory memory with instructions stored therein that are executable by a controller, and that when executed by the controller, are configured to cause the controller to perform at least some of the functions described herein.

Referring particularly to the hybrid system controller 234, during operation, the hybrid system controller 234 may perform power balancing and manage/govern other controllers within the hybrid electric system and/or perform the functionality, or cause to be performed, the functionality described herein. In addition, the hybrid system controller 234 may manage and control the energy storage system 232. Further, the hybrid system controller 234 may control aspects of operation of the gas turbine engine 202.

An example gas turbine engine 202 used in a hybrid aircraft, such as a Rolls Royce M250 engine, may include an engine controller, such as a full authority digital engine control system (FADEC) (not shown). The hybrid system controller 234 may manage and control the energy storage system 232 in accordance with control signals received from the FADEC. In other examples, the functionality of the FADEC and the hybrid system controller may be resident in the same controller or a series of controllers.

The energy storage system (ESS) 232 may include, for example, one or more energy storage device 240, such as batteries, an energy storage monitoring system 242, such as a battery monitoring system (BMS), and power electronic converters 244, such as, a low voltage DC:DC converter 246 (LVDC converter) and a high voltage DC:DC converter 248 (HVDC converter). The low voltage DC:DC converter 246 (LVDC converter) and/or the high voltage DC:DC converter 248 (HVDC converter) may be electrically connected with the energy storage device 240 and the aircraft engine supply bus 216. The energy storage monitoring system 242 may include energy storage controller 250. The ESS 232 may also include a high voltage (or HVDC) controller 252 configured to control the HVDC converter 248. The ESS 232 may use a thermal management system (not shown) for managing the temperature of components such as the energy storage device 240, the LVDC converter 246 and the HVDC converter 248 due to significant variations in temperature, such as cold temperatures at high altitude operation with little power draw from the ESS (minimal internal heating) and high temperatures such as an aircraft leaving a hot runway, heat soaked, with the ESS 232 ramping output power to maximum output. An example temperature range is from −40° C. to +55° C. ambient, where energy storage devices, such as batteries, may reach 90° C. before possible failure or damage. Components, such as the energy storage devices 240 may need cooling or heating. In hybrid system examples where the ESS 232 may be part of the electric propulsion system 200 that also includes the hybrid system controller (HSC) 234, multiple loads and power sources may be present where the HSC 234 is responsible for power balancing and governing controllers distributed within the system.

The energy storage system (ESS) 232 may be either a load or a source on the aircraft engine supply bus 216 according to operating conditions. The electric generator 204 may be rotationally driven with the gas turbine engine 202 as a turbogenerator to output electric power, which may be supplied to the one or more propulsor motors 220 via the aircraft engine supply bus 216. The energy storage device 240 may also supply electric power to the aircraft engine supply bus 216. The energy storage device 240 may be a battery, a capacitor, or any other device or system capable of storing and discharging electrical energy. The electric energy adapters 210 may adjust a voltage level and/or provide conversion of electric power between alternating current (AC) and direct current (DC).

In the example of FIG. 2, the electric energy adapters 210 include rectifiers 212 and inverters 214. The rectifiers 212 may rectify AC power received from the electric generator 204 to provide DC power to the aircraft engine supply bus

216. The inverter 214 may invert DC power received from the aircraft engine supply bus 216 to provide AC power to the propulsor motors 220. In other examples, other configurations of AC and DC power may be used, or only AC, or only DC power may be used. In the illustrated example, when the ESS 232 is supplying power, the HVDC converter 248 may convert a voltage level of DC power received from the energy storage device 240 to a different voltage level of DC power present on the aircraft engine supply bus 216. The generator 204, the ESS 232 and/or the electric energy adapters 210 may receive control communications directly or indirectly from the hybrid system controller 234.

The hybrid system controller 234 may indirectly control the generator 204, the ESS 232 and the electric energy adapters 210 via local controllers in communication with the hybrid system controller 234. The generator 204, the ESS 232 and electric energy adapters 210 may include, or be in communication with, a respective local control that provides the operational functionality of the respective system or device. For example, the generator 204 may include a local generator control configured to control the electrical characteristics and operation of the generator 204, such as the power factor angle, excitation voltage, and/or watts produced. In examples, where the energy storage device 240 is a battery, the energy storage controller circuitry 250 included in the energy storage monitoring system 242 associated with the energy storage device 240 may include the functionality to enable selective charge and discharge of the battery in accordance with predetermined operational parameters, such as charge and discharge limits. In examples, the rectifiers 212 may include a local rectifier controller circuitry configured to control active rectification switching of the rectifier 212 from AC to DC power. In examples, the inverters 214 may include a local inverter controller circuitry configured to control active conversion switching of DC power from the aircraft engine supply bus 216 to AC power to drive the propulsor motors 220.

In addition, the DC voltage and current output to the aircraft engine supply bus 216 via the HVDC converter 248 may be controlled and regulated by the HVDC controller 252. In that regard, power sensors 254, such as voltage and current sensors may monitor the aircraft engine supply bus 216 and provide dynamic sensor signals to the HVDC controller 252 to enable this control. Although illustrated in FIG. 2 as separate devices, the LVDC converter 246 and the HVDC converter 248 may be included in a common converter providing low voltage and high voltage conversion. In an example, the LVDC converter 246 may convert the energy storage device 240 output voltage to a relatively low voltage such as 28 VDC, whereas the HVDC converter 248 may output a relatively high voltage such as above 1000 VDC.

During operation, the ESS 232 may dynamically supply or receive power from the aircraft engine supply bus 216 according to the bus voltage of the aircraft engine supply bus 216. As load on the aircraft engine supply bus 216 increases faster than or beyond what the generator 204 can supply, the energy storage devices 240 may supply current via the HVDC converter 248, for example, to the aircraft engine supply bus 216 to avoid the bus voltage dropping. If, on the other hand, load on the aircraft engine supply bus 216 decreases faster than the generator 204 can respond, the energy storage devices 240 may be supplied current from the aircraft engine supply bus 216 via the HVDC converter 248 to avoid the bus voltage increasing.

In another example, total power demand required from the aircraft engine supply bus 216 is greater than the turbogenerator 204 can continuously supply, causing the ESS 232 to discharge. This case may generate the most heat generation in the energy storage devices 240, such as batteries, especially in the extreme when the turbogenerator 204 cannot supply power and all propulsive power is provided by the ESS 232—this may represent an emergency case for hybrid systems, and normal operation for all-electric systems. In still another example, regenerative power is provided by the inverters 214 and/or the rectifiers 212 such that total power demand is negative on the aircraft engine supply bus 216, causing the ESS 232 to charge the energy storage devices 240.

As the ESS 232 is supplying power and receiving power from the aircraft engine supply bus 216, the temperature of the components of ESS 232 may increase or decrease beyond desired temperature ranges. The ESS 232 may include multiple operating modes within the hybrid aircraft that influence the amount of cooling or heating the ESS 232 needs at certain stages of operation. For example, the ESS 232 may include the operating modes of:

1. High Aircraft Power Losses—Energy storage device 240 delivers maximum emergency power to the aircraft engine supply bus 216 due to high power demand.

2. Medium Aircraft Power Losses—Energy storage device 240 delivers power to the aircraft engine supply bus 216 in response to power demand being within pre-determined projected range of power output, such as providing hybrid aircraft take-off assist power.

3. Low Aircraft Power Losses—Energy storage device 240 does not deliver or receive power from aircraft engine supply bus 216—no or negligible power demand. Under this operating mode, LVDC converter 246 may still deliver power supplied via the HVDC Converter 248 from the aircraft engine supply bus 216, albeit at low power losses.

Additionally, in some implementations, in the event that the turbogenerators 204 fail, the ESS 232 may be configured to deliver or supply power to the aircraft engine supply bus 216 at a power level that is higher than a power level that the ESS 232 supplies to the bus 216 when the turbogenerators 204 are operating normally (i.e., have not failed), such as the power level scheduled to support take-off and climb to allow the aircraft to acquire sufficient altitude to allow the operator to position the aircraft for a safe landing. This mode of operation when the ESS 232 supplies higher power in the event of turbogenerator failure may be referred to as Single Engine Plus (SEP), as its availability as back-up to the single engine offers a "plus" to single engine reliability, but not to the extent of offering a platform with dual engine redundancy. Single Engine Plus (SEP) power may essentially be emergency power for propulsion. In this context, Single Engine Plus mode is also referred to herein as an emergency mode.

As mentioned, the ESS 232, via the energy storage device 240 and the HVDC converter 248, may supply power to the aircraft engine supply bus 216, and may have one or more controllers configured to control and/or regulate the supplied power. For example, the HVDC controller 252 may control and/or regulate the DC voltage and current that the HVDC converter 248 outputs to the aircraft engine supply bus 216.

In addition, for at least some implementations, the ESS 232, such as via one or more of its controllers (e.g., the energy storage controller 250 and/or the HVDC controller 252), may be configured to control, such as by limiting or reducing, the supply of power in response to one or more power reduction events. At least some of the power reduction events may include faults and/or operation of the energy storage system 232 outside of intended or target limits. One example of a power reduction event includes a temperature, such as an operating temperature, of the energy storage device 240 exceeding a threshold operating temperature value. Another example of a power reduction event includes a voltage level, such as generated and/or output by the ESS 232 and/or of the voltage on the aircraft engine supply bus 216, dropping or falling below a threshold voltage level. Another example of a power reduction event includes a state of charge (SoC) of the energy storage device 240 dropping or falling below a threshold SoC level. In this example, the SoC and threshold SoC levels may each be percentages, such as a percentage of a maximum SoC of the energy storage device 240.

When a power reduction event is detected, the ESS 232, such as via one or more of its controllers, may reduce the power it supplies to the aircraft engine supply bus 216. One way the ESS 232 may reduce the power is by performing current limiting, which reduces or limits the current supplied to the aircraft engine supply bus 216. In some implementations, the ESS 232 may reduce the supplied power and/or the current from a current level to a lower but non-zero value. In other implementations, the ESS 232 may effectively deactivate such that the supplied power level and/or current level is zero.

In some implementations, the ESS 232 may perform power reduction in response to detection of a power reduction event, such as a fault or operation of the ESS 232 outside of an intended limit. The ESS 232 may perform power reduction in order to self-protect itself from events that could cause damage to the ESS 232 and/or the energy storage device 240, such as thermal runaway and/or deep state of discharge. While being configured to reduce the power supply in response to detection of a fault or operation outside an intended limit could lead to an increased risk of false positives (e.g., the ESS 232 tripping offline when no fault has actually occurred), this power reduction feature may be acceptable because the turbogenerators 204 function as the main source of propulsive power.

Figure 3:
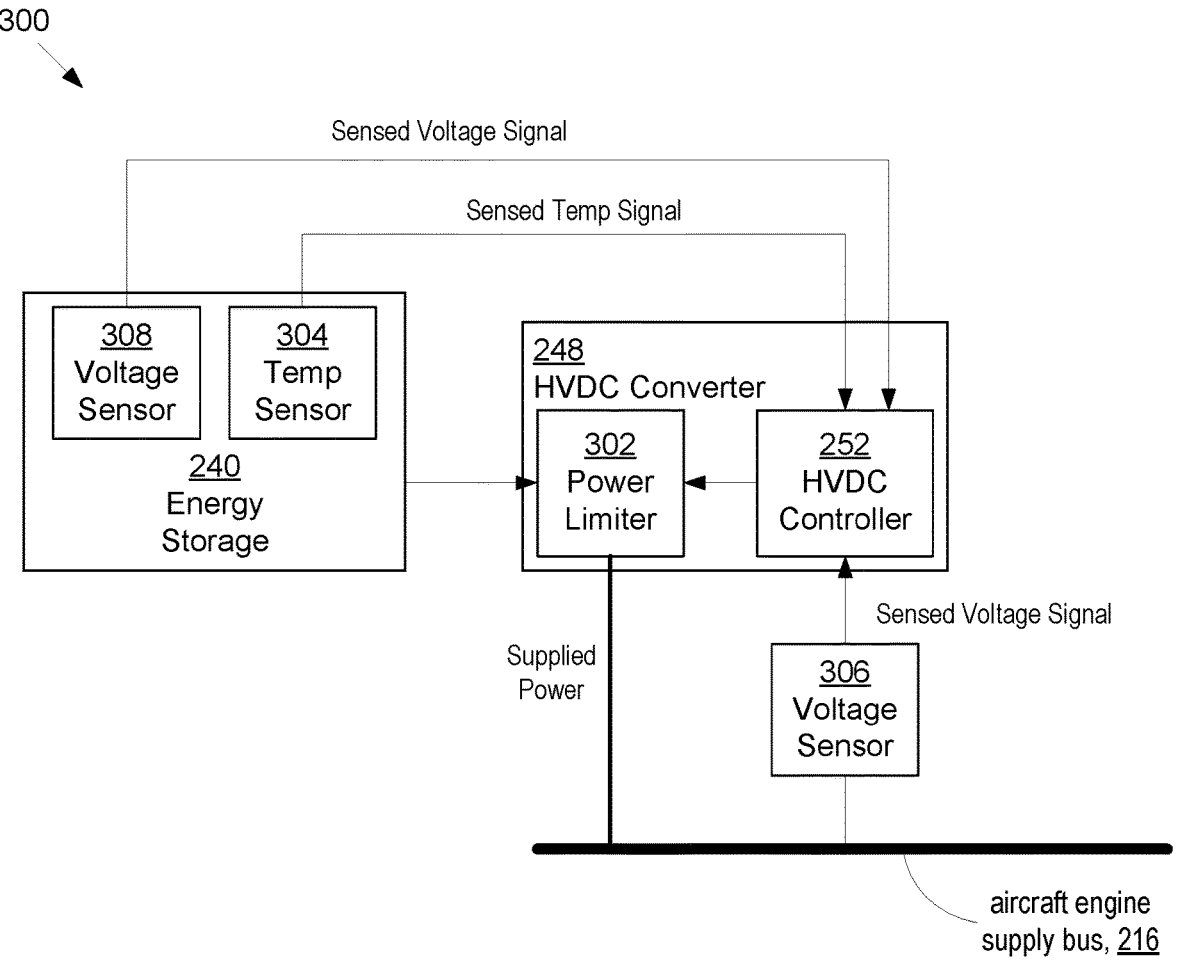
FIG. 3 is block diagram of an example power reduction system for an electric propulsion system.

FIG. 3 shows a block diagram of an example power reduction system 300 for the ESS 232 that is configured to perform power reduction of power supplied by the ESS 232 to the aircraft engine supply bus 216. The ESS 232 may include or otherwise utilize a power limiter 302 that includes circuitry, such as in the form of hardware only or a combination of hardware and software, configured to limit or reduce the power supplied to the aircraft engine supply bus 216. In some implementations, the power limiter 302 includes a current limiter configured to limit electrical current output from the ESS 232, which correspondingly limits the supplied power. The current limiter may include any of various circuitry configured to perform current limiting, including passive circuitry (e.g., resistors), active circuitry (e.g., transistors or amplifiers), and/or hardware (e.g., a CPU) executing software to perform current limiting functionality. In some implementations, the current limiter circuit includes one or more switches, such as metal-oxide-semiconductor field effect transistors (MOSFETs) or other types of transistors. In some of these implementations, the switches have an H-Bridge configuration to regulate current, with additional contactors (e.g., at the output of the energy storage 240 and/or the output of the HVDC converter 248) capable of interrupting current when tripping fully offline. Also, in some implementations, the switches, such as in the H-Bridge configuration, are controlled by pulse width modulated (PWM) signals to operate as a boost converter or a buck converter, depending on the relative voltages of the energy storage 240 and/or the aircraft engine supply bus

216. In addition or alternatively, in some examples, the current limiter uses a constant limited current reference when the power and/or current demand of the load is beyond a maximum limit. Various circuit configurations for the power limiter 302 may be possible.

Also, in some implementations such as in FIG. 3, the power limiter 302 may limit the power output from the HVDC converter 248. For example, FIG. 3 shows the power limiter 302 as a component of the HVDC converter 248 that supplies the voltage and current output of the HVDC converter 248 to the aircraft engine supply bus 216. In other implementations, the power limiter 302 may be a component separate from the HVDC converter 248. In still other implementations, the power limiter 302 may limit the power supplied from the energy storage device 240 to the HVDC converter 248, in which case the power limiter 302 may be a component of the energy storage device 240 or at least separate from the HVDC converter 248. Various ways of configuring the power limiter 302 in the ESS 232 may be possible.

Additionally, one or more controllers of the electric propulsion system 200 generally, or of the ESS 232 in particular, may be configured to control the power limiter 302. Control of the power limiter 302 may include controlling whether the power limiter 302 is activated to limit the power or deactivated to not limit the power (e.g., whether the power limiter 302 limits or does not limit how much current it transfers), and/or controlling how much the power limiter 302 limits the power (e.g., how much the power limiter 302 reduces the current it transfers). In some implementations, control of the power limiter 302 may be based on or for a given condition. In some implementations such as shown in FIG. 3, the HVDC controller 252 controls the power limiter 302.

In addition, the one or more controllers configured to control the power limiter 302 may do so based on detection or determination of whether one or more power reduction events has occurred. If the one or more controllers detects or determines that a power reduction event has occurred, then in response, the one or more controllers may control the power limiter 302 to perform power reduction (i.e., limit or reduce the power supplied to the aircraft engine supply bus 216). In addition, if the one or more controllers does not detect a power reduction event, then in response, the one or more controllers may not control the power limiter 302 to perform power reduction.

As previously explained, one power reduction event may be when the temperature of the energy storage device 240 exceeds a predetermined temperature level. Correspondingly, the ESS 232 may include one or more temperature (temp) sensors 304 configured to sense a temperature (e.g., an operating temperature) of the energy storage device 240. The one or more temperature sensors 304 may be mounted on, in, or proximate the energy storage device 240. For example, where the energy storage device 240 includes batteries, the one or more temperature sensors 304 may be mounted directly on, or embedded in, the batteries to monitor battery cell surface temperature. The one or more temperature sensors 304 may output at least one sensed temperature signal indicating a sensed temperature sensed by the one or more temperature sensors 304.

The one or more controllers configured to control the power limiter 302 may receive the sensed temperature signal from the temperature sensor 304. For example, FIG. 3 shows the HVDC controller 252 configured to receive the sensed temperature signal from the temperature sensor 304. Based on the temperature indicated by the sensed temperature signal, the one or more controllers may determine whether the temperature of the energy storage device 240 has exceeded the threshold temperature level. In event that the one or more controllers determines that it has, then the one or more controllers may control the power limiter 302 to perform power reduction (i.e., reduce the power the ESS 232 supplies to the aircraft engine supply bus 216). On the other hand, in event that the one or more controllers determines that the temperature has not exceeded the threshold temperature level, then the one or more controllers may not control the power limiter 302 to perform power reduction.

In a non-limiting example, the temperature threshold level is 80° Celsius. In this example, the one or more controllers may allow the power from the ESS 232 to the aircraft engine supply bus 216 to be supplied without power reduction unless or until it detects that the temperature has increased above 80°.

In addition or alternatively, as previously explained, another power reduction event may be when a voltage level of a voltage in the electric propulsion system 200 falls or drops below a threshold voltage level. The voltage may be a voltage on the aircraft engine supply bus 216, or may be an internal voltage of the energy storage 240. For such implementations, the ESS 232 may include one or more voltage sensors 306 configured to sense a voltage on the aircraft engine supply bus 216, and/or one or more voltage sensors 308 configured to sense one or more internal voltages of the energy storage 240. Various ways of configuring the one or more voltage sensors 308 to sense the internal voltage may be possible. For example, the one or more voltage sensors 308 may be configured to sense one or more individual cell voltages of individual cells of the energy storage 240. In addition or alternatively, the one or more voltage sensors 308 may be configured to sense an overall or combined voltage of the energy storage 240 indicative of a combined or total voltage of the energy storage 240. Additionally, the one or more voltage sensors 306 and/or the one or more voltage sensors 308 may each output at least one sensed voltage signal indicating a sensed voltage sensed by the one or more voltage sensors 306 and/or the one or more voltage sensors 308.

The one or more controllers configured to control the power limiter 302 may receive a sensed voltage signal from the voltage sensor 306 and/or the voltage sensor 308. For example, FIG. 3 shows the HVDC controller 252 configured to receive the sensed voltage signal from the voltage sensor 306 and/or the voltage sensor 308. Based on the voltage level indicated by the sensed voltage signal, the one or more controllers may determine whether the voltage has fallen below the threshold voltage level. In the event that the one or more controllers determines that it has, then the one or more controllers may control the power limiter 302 to perform power reduction (i.e., reduce the power the ESS 232 supplies to the aircraft engine supply bus 216). On the other hand, in the event that the one or more controllers determines that the voltage has not fallen below the threshold voltage level, then the one or more controllers may not control the power limiter 302 to perform power reduction. As a non-limiting example, the threshold voltage level is 600 V. In this example, the one or more controllers may allow the power from the ESS 232 to the aircraft engine supply bus 216 to be supplied without power reduction unless or until it detects that the high voltage level falls below 600 V.

In addition or alternatively, as previously explained, another power reduction event may be when the state of charge (SoC) of the energy storage device 240 falls or drops below a threshold SoC level. For at least some implementations, the ESS 232, such as via one or more of its controllers, may be configured to calculate a current SoC level of the energy storage device 240 based on the voltage indicated from the sensed voltage signal of the voltage sensor 308. The current SoC of the energy storage device 240 may be calculated in any of various ways using the voltage sensor 308. For example, the current SoC may be calculated based on one or more individual cell voltages, and/or based on the total voltage of the energy storage device 240. In addition or alternatively, the one or more controllers may calculate the current SoC using any of various techniques, such as Colomb counting or integrating charge and/or discharge over time. Other ways to calculate and/or estimate the current SoC of the energy storage device 240 at a given point in time are possible. Also, in at least some implementations, the SoC is indicated as a percentage of a maximum amount of charge stored by the energy storage device 240, or otherwise a remaining amount of charge in the energy storage device 240.

The one or more controllers configured to control the power limiter 302 may calculate, such as continuously or at periodic intervals, a current SoC of the energy storage device 240, such as based on the signal output from the voltage sensor 308. Based on the current SoC value that is calculated, the one or more controllers may determine whether the current SoC has fallen below the threshold SoC level. In event that the one or more controllers determines that it has, then the one or more controllers may control the power limiter 302 to perform power reduction (i.e., reduce the power the ESS 232 supplies to the aircraft engine supply bus 216). On the other hand, in the event that the one or more controllers determines that the current SoC has not fallen below the threshold SoC level, then the one or more controllers may not control the power limiter 302 to perform power reduction. As a non-limiting example, the threshold SoC level is 5%. In such an example, the one or more controllers may allow the power from the ESS 232 to the aircraft engine supply bus 216 to be supplied without power reduction unless or until it detects that the current SoC of the energy storage device falls below 5%.

However, in the event that the turbogenerators 204 fail, the ESS 232 offers power redundancy. In this context, if a power reduction event occurs, it may nonetheless be more favorable for product and/or human safety to keep the ESS 232 active and supplying power, as opposed to deactivating it and reducing its power output, even if doing so may drive the ESS 232 to destruction. As such, ways to prevent or delay the ESS 232 from performing power reduction even if a power reduction event occurs may be desirable. The following describes an override switch that can provide such prevention or delay.

Figure 4:
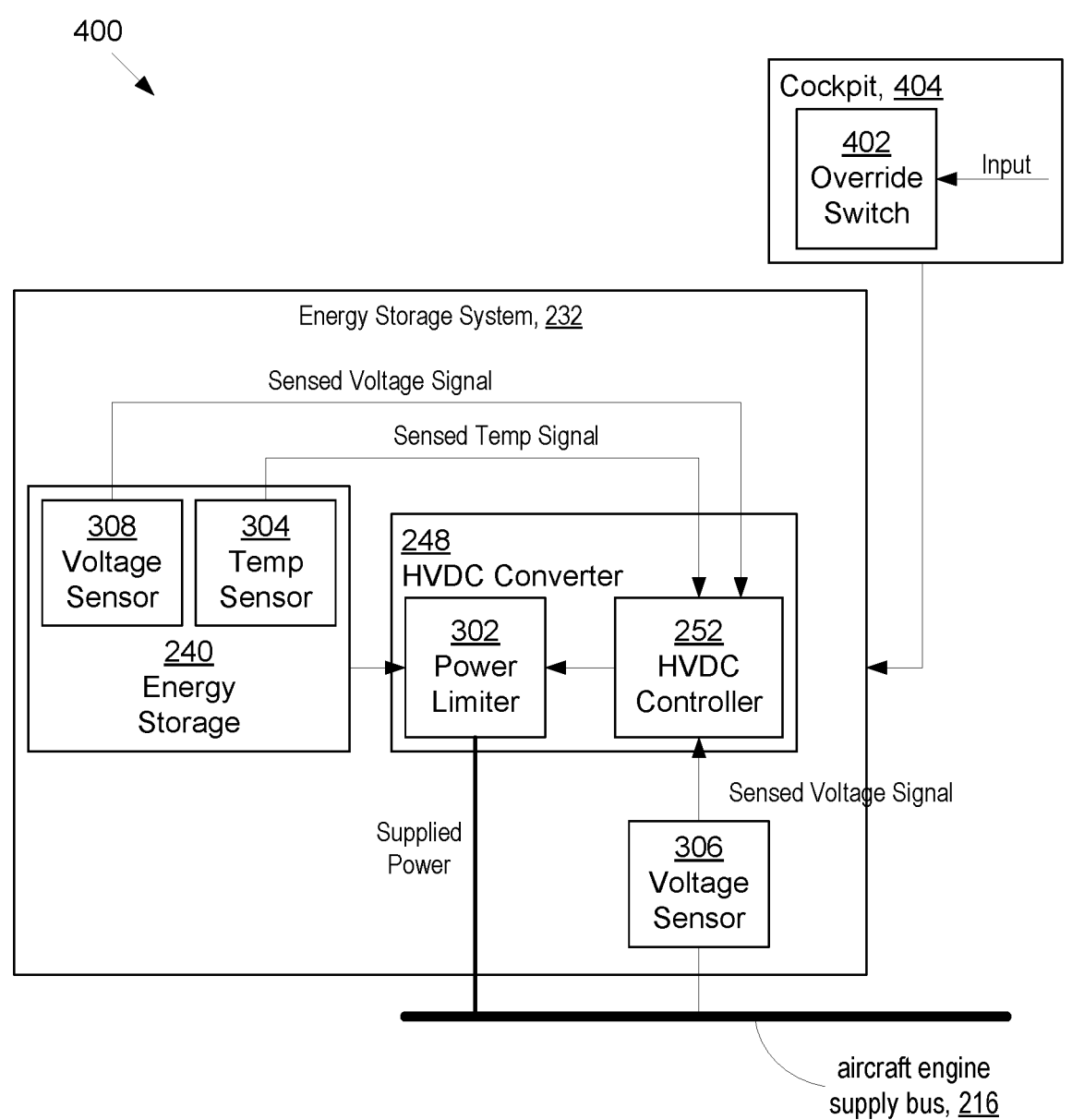
FIG. 4 is a block diagram of the example power reduction system of FIG. 3 electrically coupled to an override switch.

FIG. 4 shows a block diagram of another power reduction system 400 for the ESS 232 that is configured to perform power reduction that reduces power supplied from the ESS 232 to the aircraft engine supply bus 216. The power reduction system 400 is similar to the power reduction system 300 of FIG. 3, except that the power reduction system 400 includes an override switch 402 electrically coupled to the ESS 232 that is configured to control power reduction, including control whether power reduction is performed according to a default configuration or a relaxed configuration. The override switch 402 may be electrically coupled to the ESS 232 in any of various ways, including through a wired connection, wirelessly, optically, or any of various combinations thereof. As described in further detail below, the relaxed configuration provides a relaxed set of one or more parameters compared to the default configuration, that causes the ESS 232 to delay or avoid performance of power reduction. Under the relaxed configuration, when a power reduction event occurs that would otherwise trigger power reduction under the default configuration, the ESS 232 instead would continue to deliver power without power reduction, thus allowing the ESS 232 to deliver power for a longer period of time than it would under the default configuration. In this way, the override switch 402 provides an override of the default configuration and its more stringent triggering conditions compared to those included in the relaxed configuration.

In further detail, the override switch 402 is configurable in a plurality of states, including an override state and a non-override state. In the non-override state, the override switch 402 may permit the one or more controllers to control power reduction according to a default configuration. The default configuration may include or define one or more parameters that trigger power reduction. For example, with respect to the power reduction events described above, the default configuration may include or define one or more threshold levels, including the temperature threshold level, the voltage threshold level, and/or the state of charge threshold level. In the override state, the override switch 402 is configured to control the power reduction to be performed according to a relaxed configuration that at least one of relaxes or omits the one or more parameters in the default configuration. In general, the relaxed configuration allows the ESS 232 to supply power to the aircraft engine supply bus 216 without power reduction longer than the default configuration. It does so by delaying when one or more power reduction events or conditions triggering power reduction will occur and/or by omitting or removing one or more power reduction events or conditions from the default configuration altogether.

In an example implementation, the default configuration may include a parameter specifying that power reduction is to be performed when a temperature of the energy storage device exceeds a threshold temperature level. The relaxed configuration may relax the parameter by having a higher or hotter threshold temperature level than the one specified in the default configuration, or may not have the parameter altogether. During operation, when the override switch 402 is in the override state, control of the power reduction is performed according the relaxed configuration such that power reduction is not performed even if the temperature of the energy storage device 240 exceeds the threshold temperature level defined in the default configuration. In some implementations under the relaxed configuration, power reduction is not triggered unless or until the temperature reaches a hotter temperature level set in the relaxed configuration. In other implementations, the relaxed configuration does not define a temperature threshold level, in which case power reduction is not triggered to be performed based on the temperature of the energy storage device 240. In this way, the ESS 232 supplies power without power reduction longer when controlled according to the relaxed configuration than when controlled according to the default configuration. In one example, the default configuration sets the threshold temperature level to 80° Celsius, and the relaxed configuration sets the threshold temperature level to 90° Celsius. In some implementations, when the ESS 232 is in the Single Engine Plus mode, the ESS 232 may supply power for 50 seconds longer when power reduction is controlled according to the relaxed configuration than according to the default configuration.

As another example, the default configuration may include a parameter specifying that power reduction is to be performed when a voltage level of a voltage in the electric propulsion system 200 falls below a threshold voltage level. As previously described, the voltage may be an internal voltage of the energy storage device 240 or a voltage on the aircraft engine supply bus 216. The relaxed configuration may relax the parameter by having a lower threshold voltage level than the one specified in the default configuration, or by not including the parameter altogether. During operation, in response to the override switch 402 being in the override state, control of power reduction is performed according to the relaxed configuration such that power reduction is not performed even if the voltage falls below the threshold voltage level defined in the default configuration. In some implementations, under the relaxed configuration, power reduction is not triggered unless or until the voltage falls below a lower threshold voltage level set in the relaxed configuration. In other implementations, the relaxed configuration does not define a threshold voltage level, in which case power reduction is not performed based on a level of the voltage. In this way, the ESS 232 supplies power without power reduction longer when controlled according to the relaxed configuration than when controlled according to the default configuration. In this context, the ESS 232 supplying power "without power reduction" refers to the ESS 232 supplying power without the power limiter 302 being activated to reduce the supplied power, such as to a predetermined or target power level. Such supply of power without power reduction does not include decreases in power that naturally or inherently occur in the ESS 232, such as due to a voltage drop with a reduction in the SoC. In one example, the default configuration sets the threshold voltage level to 600 V, and the relaxed configuration sets the threshold voltage level to a level lower than 600 V, such as 400 V for example.

As another example, the default configuration may include a parameter specifying power reduction is to be performed when the state of charge (SoC) of the energy storage device 240 falls below a threshold SoC level. The relaxed configuration may relax the parameter by having a lower threshold SoC level than the one specified in the default configuration, or by not including the parameter altogether. During operation, when the override switch 402 is in the override state, control of the power reduction is performed according to the relaxed configuration such that power reduction is not performed even if the state of charge of the energy storage device 240 falls below the threshold state of charge level defined in the default configuration. In some implementations, under the relaxed configuration, power reduction is not triggered unless or until the state of charge falls below the lower threshold state of charge level. In other implementations, a threshold SoC level is not set in the relaxed configuration, in which case power reduction is not performed based on a state of charge level of the energy storage device 240. In one example, the default configuration sets the threshold SoC level to 5%, and the relaxed configuration sets the threshold SoC level to 0%.

In addition or alternatively, one or more controllers of the electric propulsion system 200, such as the hybrid system controller 234, may set and/or adjust a power limit of the power output to the aircraft engine supply bus 216 according to one more determinations or calculations, one of which may include a determination of the state of the override switch 402 (i.e., whether the override switch 402 is in the non-override state or the override state). For example, the one or more controllers may set an initial power limit, and then may adjust the initial power limit according to one or more power limit calculations, and further according to the state of the override switch 402. That is, when the override switch 402 is in the non-override state, the one or more controllers may adjust the power limit according to the one or more power limit calculations. When the override switch 402 is switched to the override state, then the one or more controllers may adjust the power limit according to the override switch 402 in the override state, overriding the other power limit calculations. In this context, the initial settings and power limit adjustments made in response to the override switch 402 being in the non-override state may be part of, or performed under, the default configuration, while power limit adjustments made in response to the override switch 402 being in the override state may be part of, or performed under, the relaxed configuration.

Figure 5:
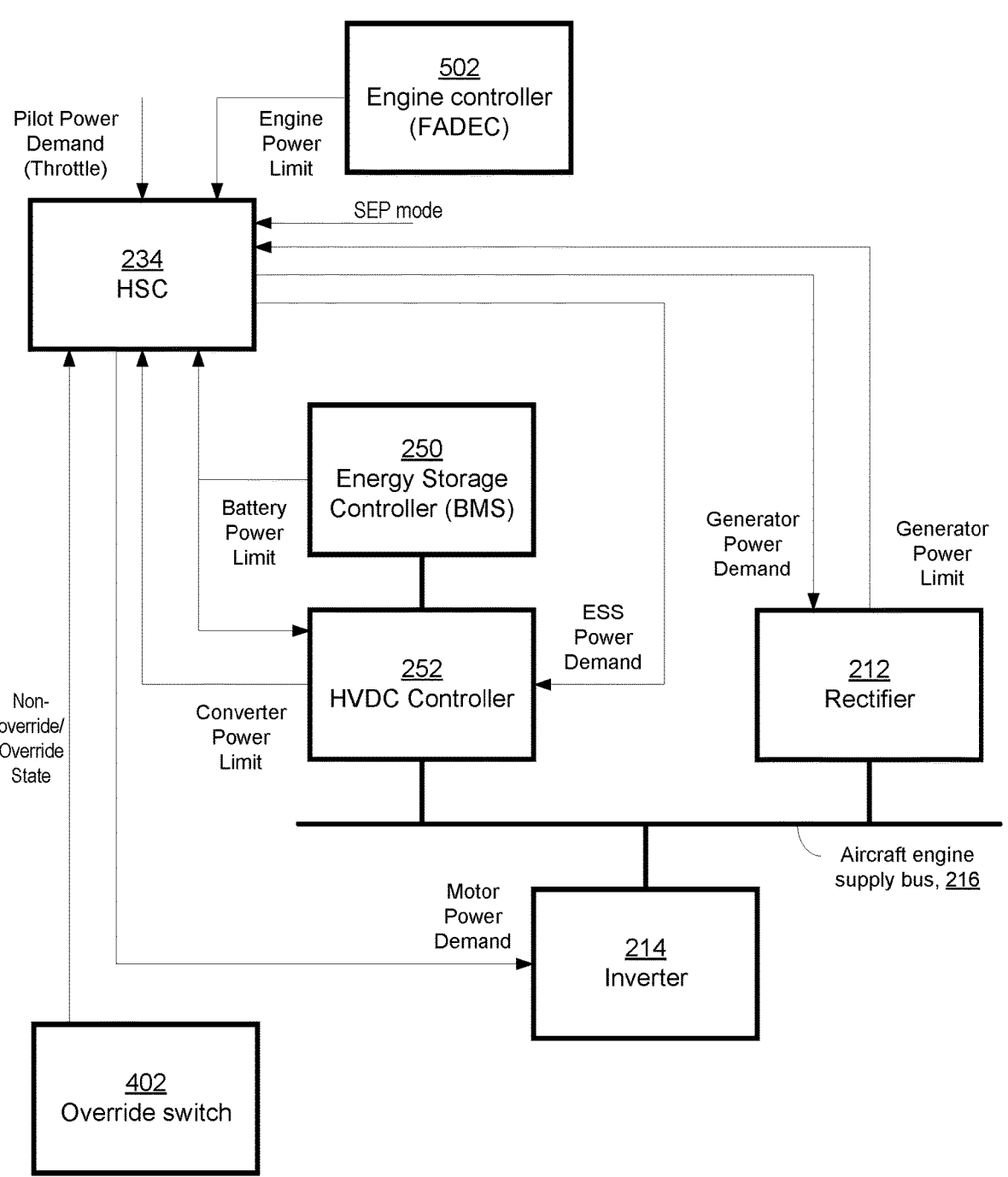
FIG. 5 is a block diagram of an example configuration of components used for calculating and setting power demands and limits.

FIG. 5 shows a block diagram of an example configuration of components of the electric propulsion system 200 in conjunction with the override switch 402 and an engine controller (FADEC) 502 used to set power limits. In the example configuration in FIG. 5, the hybrid system controller 234 is configured to set a generator power demand for the rectifier 212, an ESS power demand for the HVDC controller 252, and a motor power demand for the inverter 214. Additionally, as shown in FIG. 5, the engine controller 502, the energy storage controller 250, the HVDC controller 252, and the rectifier 212 may each be configured to determine or calculate respective power limits and provide the respective power limits to the hybrid system controller 234. For example, the engine controller 502 may determine an engine power limit, the energy storage controller 250 may determine a battery power limit, the HVDC controller 252 may determine a converter power limit, and the rectifier 212 may determine a generator power limit.

Correspondingly, the hybrid system controller 234 may be configured to set and/or adjust the power demands according to the respective power limits calculated by and received from the engine controller 502, the energy storage controller 250, the HVDC controller 252, and/or the rectifier 212. The hybrid system controller 234 may also or alternatively be configured to set and/or adjust the power demands based on the throttle power demand, whether the ESS 232 is in the SEP mode, and/or the state of the override switch 402. For example, when the override switch 402 is in the non-override state, the hybrid system controller 234, operating under the default configuration, may set and/or adjust the power demands according to the engine throttle power demand, the engine power limit, the battery power limit, the converter power limit, the generator power limit, and/or whether the ESS 232 is in the SEP mode. When the override switch 402 is in the override state, the hybrid system controller 234 may switch to operating under the relaxed configuration, and correspondingly set and/or adjust the power demands according to the relaxed configuration.

In one example configuration, the hybrid system controller 234 may initially set the actual motor power demand sent to the inverters 214 below the throttle power demand (e.g. controlled by the pilot). The initial setting may be based on an estimate of available power. In addition, the hybrid system controller 234 may change the initial setting based on a determination of whether or not the ESS 232 is in the SEP mode. In addition, the power demands may be further reevaluated and/or adjusted based on the battery power limit calculated by the energy storage controller 250, the converter power limit calculated by the HVDC controller 252, and the state of the override switch 402 (i.e., whether the override switch 402 is in the override state or the non-override state). In this context, the state of the override switch 402 is one of several inputs that the hybrid system controller 234 considers when determining how to set and/or adjust the power limits and demands.

Accordingly, the override switch 402 is able to override or not override, and/or relax or not relax, the parameters in the default configuration. Correspondingly, by being coupled to the override switch 402, the one or more controllers configured to control power reduction is configurable in an override mode and a non-override mode. That is, when the override switch 402 is in the override state, the one or more controllers is in the override mode, and when the override switch 402 is in the non-override state, the one or more controllers is in the non-override mode. Otherwise stated, the one or more controllers is in the override mode in response to the override switch 402 being in the override state, and is in the non-override mode in response to the override switch 402 being in the non-override state. In the non-override mode, the one or more controllers controls power reduction according to the default configuration. In the override mode, the one or more controllers controls power reduction according to the relaxed configuration.

In addition, the override switch 402 may be electrically coupled to the ESS 232 to control power reduction in any of various ways. In some implementations, the override switch is directly connected to one or more controller configured to control the power limiter. For example, in the example configuration in FIG. 4, the override switch 402 may be directly coupled to the HVDC controller 252, in which case the HVDC controller 252 may detect whether the override switch 402 is in the override state or the non-override state without intervention or assistance from other components. In other implementations, another component external to the ESS 232, such as the hybrid system controller 234, may be directly coupled to the override switch 402, detect whether the override switch 402 is in the override state or the non-override state, and in turn, instruct the ESS 232 how to perform power reduction based on whether the override switch 402 is in the override state or the non-override state. Various ways of electrically coupling the override switch, directly or indirectly, to the ESS 232 in order to control power reduction is possible.

In addition, in some implementations, in response to the override switch 402 being in the override state, the ESS 232 may not switch to performance of power reduction from the default configuration to the relaxed configuration unless or until the ESS 232 is in the Single Engine Plus mode. For example, a controller (e.g., the hybrid system controller 234, the energy storage controller 250, or the HVDC controller 252) may detect that the override switch 402 has switched from the non-override state to the override state. In response, before causing the ESS 232 to be configured to perform power reduction according to the relaxed configuration, the controller may check whether the hybrid system is in the Single Engine Plus mode. If it is, then the controller may switch the power reduction configuration from the default configuration to the relaxed configuration. If it is not, then the controller may continue to have power reduction controlled according to the default configuration.

Additionally, in at least some implementations, the override switch 402 is configured to be operated on by a person or is otherwise configured to receive a manual or human input, and switch between the override and non-override states in response to the manual input. For example, the override switch 402 may remain in one of the override and non-override states unless or until the override switch 402 receives a manual input that switches the override switch 402 to the other of the override and non-override states. Accordingly, the override switch 402 provides an aircraft with the ability for a person, such as a pilot, to intervene in the power reduction performance of the ESS 232. The manual input may be in the form of any of a variety of types of inputs that a human can generate. For example, the manual input may be mechanical, such as with an exertion of mechanical force by a person's hand or other object. In some implementations, the mechanical input may move a physical object, such as a lever or a button, which in turn configures the override switch 402 in the override and non-override states. In some other implementations, the mechanical input may effect an electrical response, such as a touch input onto a touchscreen interface, that in turn configures the override switch 402 in the override and non-override states. In other examples, the manual input may be audible, such as a person's voice. In still other examples, the manual input may be biometric, such as a biometric scan (e.g., a retinal scan, or fingerprint scan). Various ways of implementing the override switch 402 to switch between the override and non-override states according to a human's input are possible.

Additionally, for at least some implementations such as in FIG. 4, the override switch 402 is disposed or positioned in a cockpit 404 of an aircraft, such as an aircraft having the gas turbine engine 100 of FIG. 1 and/or the electric propulsion system 200 of FIG. 2. Positioning the override switch 402 in the cockpit 404 provides a pilot with the ability to manually override the power reduction performance of the ESS if the pilot so wants while in the cockpit 404.

As mentioned, in the event that the generators 204 fail, allowing the ESS 232 to continue to supply power without power limiting despite occurrence of a power reduction event may, in some circumstances, be more favorable than activating the power limiter 302. However, whether it is more favorable to do so may vary on a case-by-case basis, and the decision may be best left to a person (e.g., a pilot) rather than implemented as an automated process. The override switch 402 configured to receive manual inputs to switch between the override and non-override states affords the ability for a human to manually intervene in the power reduction process on a case-by-case basis. Accordingly, the override switch 402 may allow the pilot to relax the requirements or thresholds that trigger power reduction, such that the ESS 232 is able to deliver power longer, including when the ESS 232 is in the Single Engine Plus (or emergency) mode.

In practice, controlling power reduction according to the relaxed configuration may increase the risk of damage (including irreversible damage) to components of the ESS 232 such that replacement may be desirable prior to subsequent flights. However, using the override switch 402 may provide pilots with the ability to enter an ESS override at any time, and force the ESS 232 to operate in the Single Engine Plus mode if the ESS 232 has not already entered the Single Engine Plus Mode due to failure of the turbogenerators 204. In some implementations, a pilot may not configure the override switch 402 in the override state unless the aircraft performance is not as expected, such as in event the aircraft is not achieving an expected climb rate or other on-edge performance concerned that can be alleviated by causing the ESS 232 to supply extra power to the aircraft engine supply bus 216. In this way, the override switch 402 in the override state, and/or the ESS 232 in the override mode, may cause damage to the aircraft equipment, but less damage than might occur without the ESS 232 supplying power to the aircraft engine supply bus 216.

Additionally, in some implementations, control of power reduction according to the relaxed configuration may reduce the probability of false positives. For example, the relaxed configuration may remove redundant trips and/or less critical trips, and/or increase trip persistence. In this way, the relaxed configuration provides an alternative set of trip parameters activated by the override switch 402 in the override state. The override switch 402 in the override state may: reduce trip margin such that the override trip level is closer to a limit than the non-override trip point, increase persistence to filter out nuisance faults and/or false positives, remove non-critical trips, and/or remove redundant trips.

Additionally, in some implementations, the override switch 402 in the override state, the ESS 232 in the override mode, and/or the relaxed configuration may cause the one or more controllers controlling power reduction to abstain from power reduction in response to detection of a malfunctioning, failed, or open circuit sensor. In contrast, under the default configuration, the one or more controllers may be triggered to perform power reduction in response to such a detection. In addition or alternatively, the one or more controllers may be configured to accept signals from good or healthy sensors in instances of sensor redundancy, and consider signals from bad sensors as false positives. In doing so, the one or more controllers may not perform power reduction in response to detection of a bad sensor. As a result, the override switch 402 offers a pilot the ability to reduce the probability of false positive trips by preventing any one piece of data to take the ESS 232 offline. When the override switch 402 is in the non-override state, the ESS 232 may trip (e.g., perform power reduction) because a redundant feature, such as bus redundancy, is available for sustained power. However, in response to the override switch 402 being in the override state, the ESS 232 may avoid or delay tripping (e.g., operate under relaxed conditions before performing power reduction) because the aircraft may only have power remaining from the ESS 232, and in turn extended availability of the ESS 232 may be needed.

In addition or alternatively, in response to the override switch 402 being in the override state, the energy storage controller 250 may allow continued operation of the ESS 232 (e.g., avoid power reduction) in event that the one or more controllers detects at least one of the temperature sensors 304 as an open circuit temperature sensor. Doing so may provide the pilot with ability to prevent the loss of the ESS 232, including in the Single Engine Plus mode, due to a small number of the sensors among a relatively large amount of sensors detected as a failed open circuit sensor.

In addition or alternatively, in response to the override switch 402 being in the override state, the energy storage monitoring system 242 may use neighboring temperature sensors of the failed or open circuit temperature sensors 304 that are detected to sense the temperature of the energy storage device 240 and/or of those cells associated with the failed temperature sensors. As a result, power reduction may be avoided in response to detection of an open circuit sensor of the temperature sensors 304.

Figure 6:
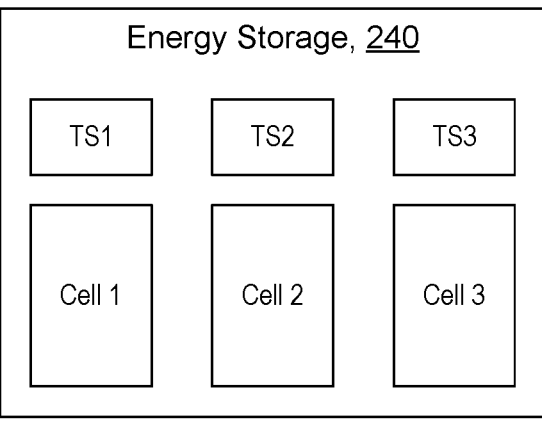
FIG. 6 is a block diagram of cells of an energy storage device and neighboring temperature sensors for the cells.

FIG. 6 illustrates an example of use of neighboring temperature sensors when the override switch 402 is in the override state. The example includes three cells (or battery cells) of the energy storage device 240, including Cell 1, Cell 2, and Cell 3. Suppose temperature sensor (TS) 1 is configured to sense the temperature of Cell 1, temperature sensor (TS) 2 is configured to sense the temperature of Cell 2, and temperature sensor (TS) 3 is configured to sense the temperature of Cell 3. Additionally, suppose a controller, such as the energy storage controller 250, identifies temperature sensors TS1, TS2, and TS3 as neighboring temperature sensors of each other. In event that, for example, TS2 fails, becomes an open circuit, or malfunctions, the controller may detect the temperature of Cell 2 based on the sensor reading of neighbor temperature sensors TS1 and/or TS3.

Additionally, in some implementations, after a flight during which the override switch 402 was configured in the override state, post analysis may be performed to determine whether configuration of the override switch 402 in the override switch created operational damage, malfunction, or exceedance necessitating replacement of one or more components of the ESS 232, such as the energy storage device 240. In order for post analysis to be performed, one or more controllers of the electric propulsion system 200 may continue to record exceedances of original (non-override) trip limits, that is, exceedances of the parameters of the default configuration. For example, suppose the default configuration identifies a threshold temperature level of 80°. When the ESS 232 is in the override mode and operates under the relaxed configuration, the ESS 232 may still record occurrences of when the temperature of the energy storage device 240 exceeds 80° even though the relaxed configuration specifies a threshold temperature level higher than 80° for power reduction.

Figure 7:
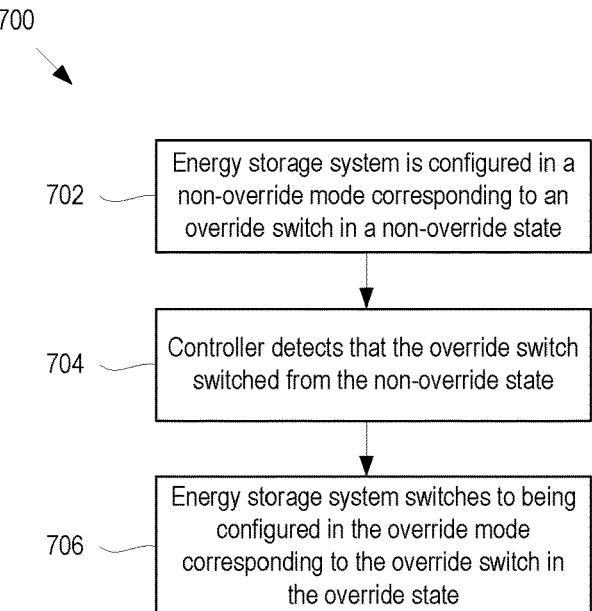
FIG. 7 is a flow chart of an example method of configuring an energy storage system coupled to an override switch.

FIG. 7 shows a flow chart of an example method 700 of configuring the ESS 232 for power reduction. At block 702, the ESS 232 may be configured in a non-override mode. In the non-override mode, the ESS 232 may perform or control performance of power reduction according to a default configuration, as previously described. For example, the ESS 232 may activate or not activate (or keep deactivated) the power limiter 302 according to one or more parameters defined in the default configuration. When a parameter in the default configuration is not triggered, such as when a threshold level associated with the parameter is not reached or crossed, the power limiter 302 stays deactivated. On the other hand, when a parameter in the default configuration is triggered, such as when a threshold level associated with the parameter is reached or crossed, the power limiter 302 is activated to reduce power supplied from the ESS 232 to the aircraft engine supply bus 216. At block 704, a controller of the aircraft, such as a controller in the electric propulsion system 200, may detect that the override switch 402 has switched from a non-override state to an override state. At block 706, the ESS 232 may switch from being configured in the non-override mode to the override mode in response to detection of the override switch 402 switching from the non-override state to the override state. As previously described, in the override mode, the ESS may perform power reduction or control performance of power reduction according to a relaxed configuration, which relaxes or omits the parameters set in the default configuration. Correspondingly, when the ESS 232 is in the override mode, the ESS 232 may continue to the deliver power to the aircraft engine supply bus 216 without activation of the power limiter 302 even in the event a parameter set forth in the default configuration is triggered.

Figure 8:
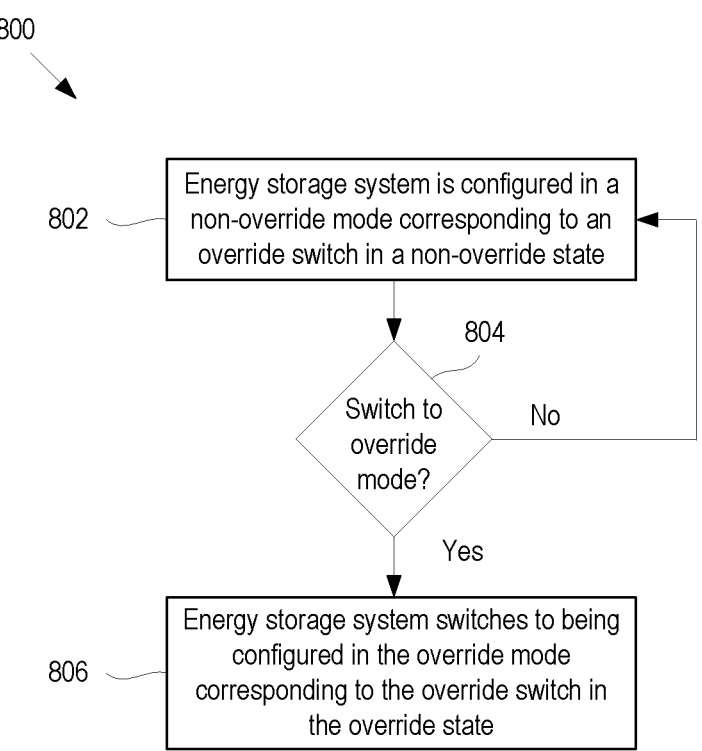
FIG. 8 is a flow chart of another example method of configuring an energy storage system coupled to an override switch.

FIG. 8 shows a flow chart of another example method 800 of configuring the ESS 232 for power reduction. At block 802, the ESS 232 may be configured in a non-override mode. In the non-override mode, the ESS 232 may perform or control performance of power reduction according to a default configuration, as previously described. For example, the ESS 232 may activate or not activate (or keep deactivated) the power limiter 302 according to one or more parameters defined in the default configuration. When a parameter in the default configuration is not triggered, such as when a threshold level associated with the parameter is not reached or crossed, the power limiter 302 stays deactivated. On the other hand, when a parameter in the default configuration is triggered, such as when a threshold level associated with the parameter is reached or crossed, the power limiter 302 is activated to reduce power supplied from the ESS 232 to the aircraft engine supply bus 216.

At block 804, a controller of the aircraft, such as a controller in the electric propulsion system 200, may determine whether to switch from the non-override mode to the override mode. In some implementations, the controller may make the determination at predetermined time intervals. In other implementations, the controller may make the determination in response to a triggering event, such as in response to detection that the override switch 402 has switched from the non-override state to the override state. Additionally, the controller may determine whether to switch to the override mode according to any of various criteria or conditions, as described above. For example, the controller may switch to the override mode in direct response to detecting that the override switch 402 switched to the override state. As another example, the controller, upon detecting that override switch 402 switched to the override state, may further check whether the ESS 232 is in the SEP mode. If the ESS is in the SEP mode, then the controller may determine to switch to the override mode. If the ESS 232 is not in the SEP mode, then the controller may determine not to switch to the override mode.

At block 804, if the controller determines not to switch to the override mode, then the method 800 may proceed back to block 802, where the ESS 232 remains in the non-override mode. Additionally, if at block 804 the controller determines to switch to the override mode, then at block 806, the ESS 232 may switch from being configured in the non-override mode to the override mode. As previously described, in the override mode, the ESS 232 may perform power reduction or control performance of power reduction according to a relaxed configuration, which relaxes or omits the parameters set in the default configuration. Correspondingly, when the ESS 232 is in the override mode, the ESS 232 may continue to deliver power to the aircraft engine supply bus 216 without activation of the power limiter 302 even in the event a parameter set forth in the default configuration is triggered.

Various other methods, in addition or alternative to the method 700 and/or the method 800 are possible, including those that perform one or more of the various actions and/or functions previously described with respect to the components described with reference to FIGS. 1-6.

The methods, devices, processing, circuitry, and logic described above may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

In some examples, each unit, subunit, and/or module of the system may include a logical component. Each logical component may be hardware or a combination of hardware and software. For example, each logical component may include an application specific integrated circuit (ASIC), a Field Programmable Gate Array (FPGA), a digital logic circuit, an analog circuit, a combination of discrete circuits, gates, or any other type of hardware or combination thereof. Alternatively or in addition, each logical component may include memory hardware, such as a portion of the memory, for example, that comprises instructions executable with the processor or other processors to implement one or more of the features of the logical components. When any one of the logical components includes the portion of the memory that comprises instructions executable with the processor, the logical component may or may not include the processor. In some examples, each logical components may just be the portion of the memory or other physical memory that comprises instructions executable with the processor or other processor to implement the features of the corresponding logical component without the logical component including any other hardware. Because each logical component includes at least some hardware even when the included hardware comprises software, each logical component may be interchangeably referred to as a hardware logical component.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . or <N>" or "at least one of <A>, <B>, . . . <N>, or combinations thereof" or "<A>, <B>, . . . and/or <N>" are defined by the Applicant in the broadest sense, superseding any other implied definitions hereinbefore or hereinafter unless expressly asserted by the Applicant to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed. Unless otherwise indicated or the context suggests otherwise, as used herein, "a" or "an" means "at least one" or "one or more."

While various embodiments have been described, it will be apparent to those of ordinary skill in the art that many more embodiments and implementations are possible. Accordingly, the embodiments described herein are examples, not the only possible embodiments and implementations.

The subject-matter of the disclosure may also relate, among others, to the following aspects:

A first aspect includes a power reduction system for an energy storage system of an aircraft, including: a controller configured to control power reduction of power supplied from the energy storage system to an aircraft engine supply bus; and an override switch configurable in an override state and a non-override state. The override switch is configured to: in the non-override state, permit the controller to control the power reduction according to a default configuration including one or more parameters that trigger the power reduction; and in the override state, control the power reduction to be performed according to a relaxed configuration that at least one of relaxes and omits the one or more parameters in the default configuration.

A second aspect includes the first aspect, and further includes wherein the relaxed configuration sets a threshold temperature level of an energy storage device that is higher than a threshold temperature level set in the default configuration.

A third aspect includes the first aspect, and further includes wherein the relaxed configuration omits a parameter to perform the power reduction when a temperature of an energy storage device exceeds a threshold temperature level.

A fourth aspect includes any of the first through third aspects, and further includes wherein the relaxed configuration sets a threshold voltage level that is lower than a threshold voltage level set in the default configuration.

A fifth aspect includes any of the first through third aspects, and further includes wherein the relaxed configuration omits a parameter to perform the power reduction when a voltage falls below a threshold voltage level.

A sixth aspect includes any of the first through fifth aspects, and further includes wherein the relaxed configuration sets a threshold state of charge level that is lower than a threshold state of charge level set in the default configuration.

A seventh aspect includes any of the first through fifth aspects, and further includes wherein the relaxed configuration omits a parameter to perform the power reduction when a state of charge of an energy storage device falls below a threshold state of charge level.

An eighth aspect includes any of the first through seventh aspect, and further includes wherein the relaxed configuration indicates to abstain from the power reduction in response to detection of an open circuit sensor.

A tenth aspect includes any of the first through ninth aspects, and further includes wherein the override switch is positioned in a cockpit of an aircraft.

An eleventh aspect includes any of the first through tenth aspects, and further includes wherein the override switch is configured to receive a manual input to switch between the override state and the non-override state.

A twelfth aspect includes any of the first through eleventh aspects, and further includes wherein in response to the override switch in the override state, the controller is configured to identify a temperature of a cell of an energy storage device based on a temperature reading of a neighbor temperature sensor when a temperature sensor for the cell becomes an open circuit.

A thirteenth aspect includes any of the first through twelfth aspects, and further includes wherein the controller is configured to record one or more exceedances of the one or more parameters of the default configuration while the override switch is in the override state.

A fourteenth aspect includes an energy storage system including: an energy storage device; a power limiter configured to limit power supplied from the energy storage device to an aircraft engine supply bus; and a controller configured to: control the power limiter according to a default configuration in response to an override switch in a non-override state; and control the power limiter according to a relaxed configuration in response to the override switch in an override state, the relaxed configuration at least one of relaxing and omitting one or more parameters in the default configuration that triggers power limiting performed by the power limiter.

A fifteenth aspect includes the fourteenth aspect, and further includes wherein the relaxed configuration sets a threshold temperature level of an energy storage device that is higher than a threshold temperature level set in the default configuration.

A sixteenth aspect includes any of the fourteenth or fifteenth aspects, and further includes wherein the relaxed configuration sets a threshold voltage level that is lower than a threshold voltage level set in the default configuration.

A seventeenth aspect includes any of the fourteenth through sixteenth aspects, and further includes wherein the relaxed configuration sets a threshold state of charge level that is lower than a threshold state of charge level set in the default configuration.

A nineteenth aspect includes any of the fourteenth through eighteenth aspects, and further includes wherein in response to the override switch in the override state, the controller is configured to identify a temperature of a cell of an energy storage device based on a temperature reading of a neighbor temperature sensor when a temperature sensor for the cell becomes an open circuit.

A twentieth aspect includes a method for power reduction in an aircraft, the method comprising: configuring an energy storage system of an aircraft in a non-override mode, the energy storage system configured to perform power reduction according to a default configuration in the non-override mode; detecting, with a controller, that an override switch switched from a non-override state to an override state; and configuring the energy storage system in an override mode in response to the override switch in the override state, the energy storage system configured to perform power reduction according to a relaxed configuration in the override mode.

In addition to the features mentioned in each of the independent aspects enumerated above, some examples may show, alone or in combination, the optional features mentioned in the dependent aspects and/or as disclosed in the description above and shown in the figures.

What is claimed is:

1. A power reduction system for an energy storage system of an aircraft, the power reduction system comprising:
   a controller configured to control power reduction of power supplied from the energy storage system to an aircraft engine supply bus; and
   an override switch configurable in an override state and a non-override state, wherein the override switch is configured to:
      in the non-override state, permit the controller to control the power reduction according to a default configuration comprising one or more parameters that trigger the power reduction; and
      in the override state, control the power reduction to be performed according to a relaxed configuration that at least one of relaxes and omits the one or more parameters in the default configuration, wherein one or both of:
         the relaxed configuration sets a threshold temperature level of an energy storage device that is higher than a threshold temperature level set in the default configuration; and
         the relaxed configuration omits a parameter to perform the power reduction when a temperature of the energy storage device exceeds the threshold temperature level.

2. The power reduction system of claim 1, wherein the relaxed configuration sets a threshold voltage level that is lower than a threshold voltage level set in the default configuration.

3. The power reduction system of claim 1, wherein the relaxed configuration omits a parameter to perform the power reduction when a voltage falls below a threshold voltage level.

4. The power reduction system of claim 1, wherein the relaxed configuration sets a threshold state of charge level that is lower than a threshold state of charge level set in the default configuration.

5. The power reduction system of claim 1, wherein the relaxed configuration omits a parameter to perform the power reduction when a state of charge of an energy storage device falls below a threshold state of charge level.

6. The power reduction system of claim 1, wherein the relaxed configuration indicates to abstain from the power reduction in response to detection of an open circuit sensor.

7. The power reduction system of claim 1, wherein the override switch is positioned in a cockpit of an aircraft.

8. The power reduction system of claim 1, wherein the override switch is configured to receive a manual input to switch between the override state and the non-override state.

9. The power reduction system of claim 1, wherein in response to the override switch in the override state, the controller is configured to identify a temperature of a cell of an energy storage device based on a temperature reading of a neighbor temperature sensor when a temperature sensor for the cell becomes an open circuit.

10. The power reduction system of claim 1, wherein the controller is configured to record one or more exceedances of the one or more parameters of the default configuration while the override switch is in the override state.

11. An energy storage system comprising:
   an energy storage device;
   a power limiter configured to limit power supplied from the energy storage device to an aircraft engine supply bus; and
   a controller configured to:
      control the power limiter according to a default configuration in response to an override switch in a non-override state; and
      control the power limiter according to a relaxed configuration in response to the override switch in an override state, the relaxed configuration at least one of relaxing and omitting one or more parameters in the default configuration that triggers power limiting performed by the power limiter, wherein one or both of:
         the relaxed configuration sets a threshold temperature level of the energy storage device that is higher than a threshold temperature level set in the default configuration; and
         the relaxed configuration omits a parameter to perform the power limiting when a temperature of the energy storage device exceeds the threshold temperature level set in the default configuration.

12. The energy storage system of claim 11, wherein the relaxed configuration sets a threshold voltage level that is lower than a threshold voltage level set in the default configuration.

13. The energy storage system of claim 11, wherein the relaxed configuration sets a threshold state of charge level that is lower than a threshold state of charge level set in the default configuration.

14. The energy storage system of claim 11, wherein in response to the override switch in the override state, the controller is configured to identify a temperature of a cell of an energy storage device based on a temperature reading of a neighbor temperature sensor when a temperature sensor for the cell becomes an open circuit.

15. A method for power reduction in an aircraft, the method comprising:
   configuring an energy storage system of an aircraft in a non-override mode, the energy storage system configured to perform power reduction according to a default configuration in the non-override mode;
   detecting, with a controller, that an override switch switched from a non-override state to an override state; and
   configuring the energy storage system in an override mode in response to the override switch in the override state, the energy storage system configured to perform power reduction according to a relaxed configuration in the override mode, wherein the relaxed configuration one or both of:
      sets a threshold temperature level of an energy storage device of the energy storage system that is higher than a threshold temperature level set in the default configuration; and
      omits a parameter to perform the power limiting when a temperature of the energy storage device exceeds the threshold temperature level set in the default configuration.

* * * * *